United States Patent [19]

Sperring

[11] Patent Number: 5,529,346
[45] Date of Patent: Jun. 25, 1996

[54] JOINTS

[75] Inventor: Christopher Sperring, Singapore, Singapore

[73] Assignee: Intellectual Property Holdings Pte Limited, Singapore

[21] Appl. No.: 428,159

[22] PCT Filed: Oct. 21, 1993

[86] PCT No.: PCT/GB93/02175

§ 371 Date: Apr. 20, 1995

§ 102(e) Date: Apr. 20, 1995

[87] PCT Pub. No.: WO94/11718

PCT Pub. Date: May 26, 1994

[30] Foreign Application Priority Data

Nov. 10, 1992 [GB] United Kingdom ............. 9223481

[51] Int. Cl.⁶ .................................................. F16L 35/00
[52] U.S. Cl. .............................. 285/93; 285/363; 285/910; 277/2
[58] Field of Search ........................... 285/93, 363, 910; 277/2

[56] References Cited

U.S. PATENT DOCUMENTS 1,569,837  1/1926  MacDonald .
3,151,258  9/1964  Sonderegga et al. ............. 411/548 X
3,358,257  12/1967  Painter et al. ....................... 73/775 X
4,573,351  3/1986  Wiener .
5,121,929  6/1992  Cobb .
5,380,014  1/1995  Schaperkotter ..................... 277/2

FOREIGN PATENT DOCUMENTS 0140066  5/1985  European Pat. Off. .
0363785  4/1990  European Pat. Off. .

Primary Examiner—Dave W. Arola
Attorney, Agent, or Firm—Bliss McGlynn

[57] ABSTRACT

A joint which comprises a first joint component having an axial aperture and a second joint component having an axial aperture arranged coaxially with the aperture in the first joint component. The joint components have a gasket ring interposed therebetween to act as a fluid seal. The components are joined by bolts and within the gasket ring are a number of stress or strain responsive elements equispaced around the entire periphery of the gasket ring, each comprising a pair of electrodes sandwiching a stress or strain responsive material. The responsive elements have opposed faces which are spaced from the opposed faces of the gasket ring and the electrodes and are connected to an output via leads to give an indication of the stress or strain within each individual element corresponding to the torque force applied to a proximate bolt.

9 Claims, 7 Drawing Sheets

JOINTS

The present invention is concerned with joints and, in particular joints having gaskets between complementary faces thereof.

As is well known, the purpose of a gasket is to seal a joint. There are many methods of sealing a joint but the most common way is by employing bolts extending perpendicular to the joint to exert pressure on the gasket. The pressure exerted within the gasket must exceed the pressure within the system, or else the gasket will not perform its function and therefore whatever the gasket is trying to contain will inevitably escape.

A problem with the use of bolts to cause components to engage on the face of a gasket is that the bolts are tightened individually, with the inevitable effect that the applied torque, and therefore the resulting force, is not evenly distributed throughout the gasket, thus causing local variations in applied pressure around the gasket. For example, in the case where there are four bolts equispaced around a joint, the tightening of one bolt inevitably causes some distortion of the diametrically opposed bolt. It is thus difficult to achieve equalised distribution of force. Although torque indicators can be used with the tightening spanners, these indicate the torque applied rather than the resultant force in the gasket.

The present invention seeks to provide a joint in which such disadvantages can be at least alleviated.

According to the present invention, therefore, there is provided a joint comprising a first joint component having an axial aperture, a second joint component having an axial aperture arranged to be coaxial with the first mentioned aperture, a gasket arranged to be interposed between said components, and a plurality of bolts arranged to secure said first joint component to said second component with said gasket interposed therebetween with opposed faces in contact with respective joint components, wherein said gasket incorporates a plurality of stress or strain responsive elements substantially equispaced around the entire periphery of said gasket, each of said responsive elements comprising a pair of electrodes having a stress or strain responsive material sandwiched therebetween, each said responsive element having opposed faces which are spaced from the respective opposed faces of said gasket, and means for connecting each of said responsive elements to an output display so as to give detectable indication of the stress or strain applied to each individual one of said responsive elements corresponding to the torque force applied to a proximate bolt.

The responsive elements therefore do not respond to the torque applied to the bolts, but to the force induced in the gasket during installation.

The joint components are typically tubular members and the gasket is then annular.

It is preferred that the responsive elements are encapsulated within the gasket. Advantageously at least four equispaced responsive elements are provided.

Preferably the gasket is provided with throughbores extending therethrough arranged to be complementary to throughbores provided for the bolts in said first and second joint components.

It is particularly preferred that the plurality of responsive elements are equal in number to the number of the plurality of bolts.

Typically the strain responsive elements are of the type suitable for inclusion in a strain gauge. In a preferred embodiment of the present invention the joint comprises a plurality of piezoelectric elements each comprising a pair of electrodes having a piezoelectric material sandwiched therebetween.

In one embodiment of the invention, the plurality of responsive elements is arranged around the entire periphery of the gasket such that a line drawn from the axis of said aperture radially outward through each bolt passes through a respective responsive element.

Further preferred features of the present invention will now be described, by way of example only, with reference to the accompanying drawings, in which.

Figure 1:
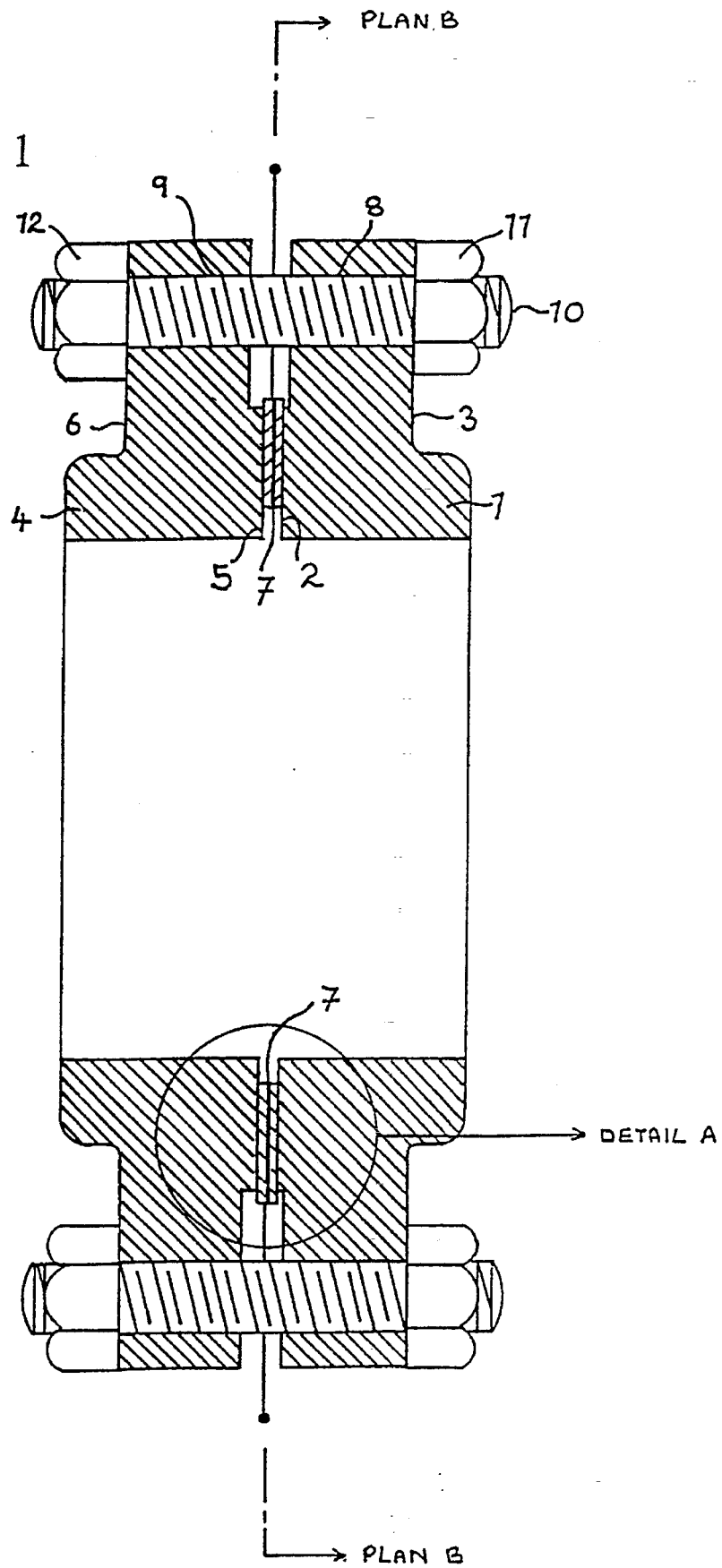
FIG. 1 is a longitudinal sectional view of an exemplary embodiment of a joint according to the invention in which the responsive elements are piezoelectric elements.
Figure 2:
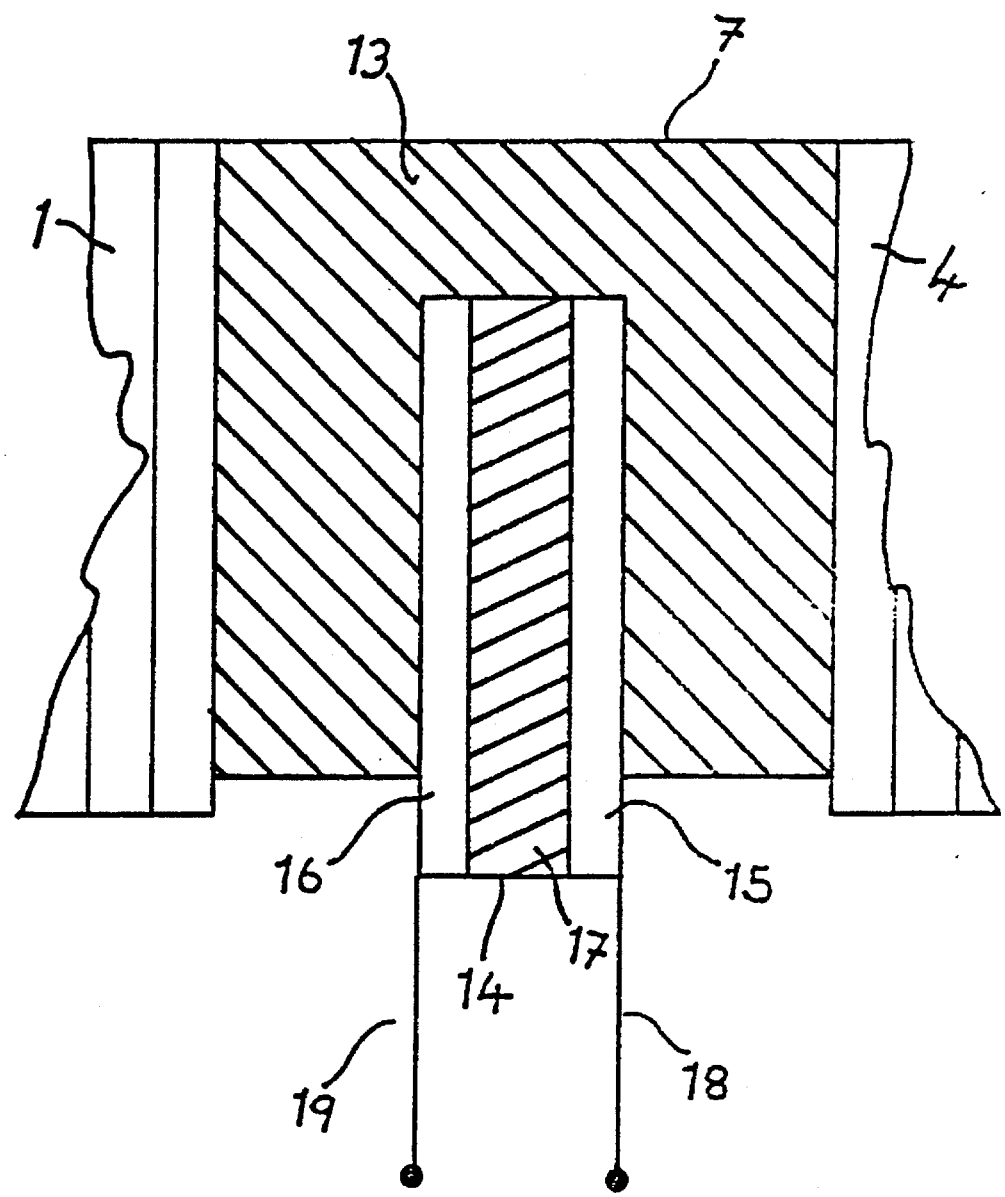
FIG. 2 is a longitudinal sectional view on enlarged scale of the gasket region (Detail A) of the joint of FIG. 1.
Figure 3:
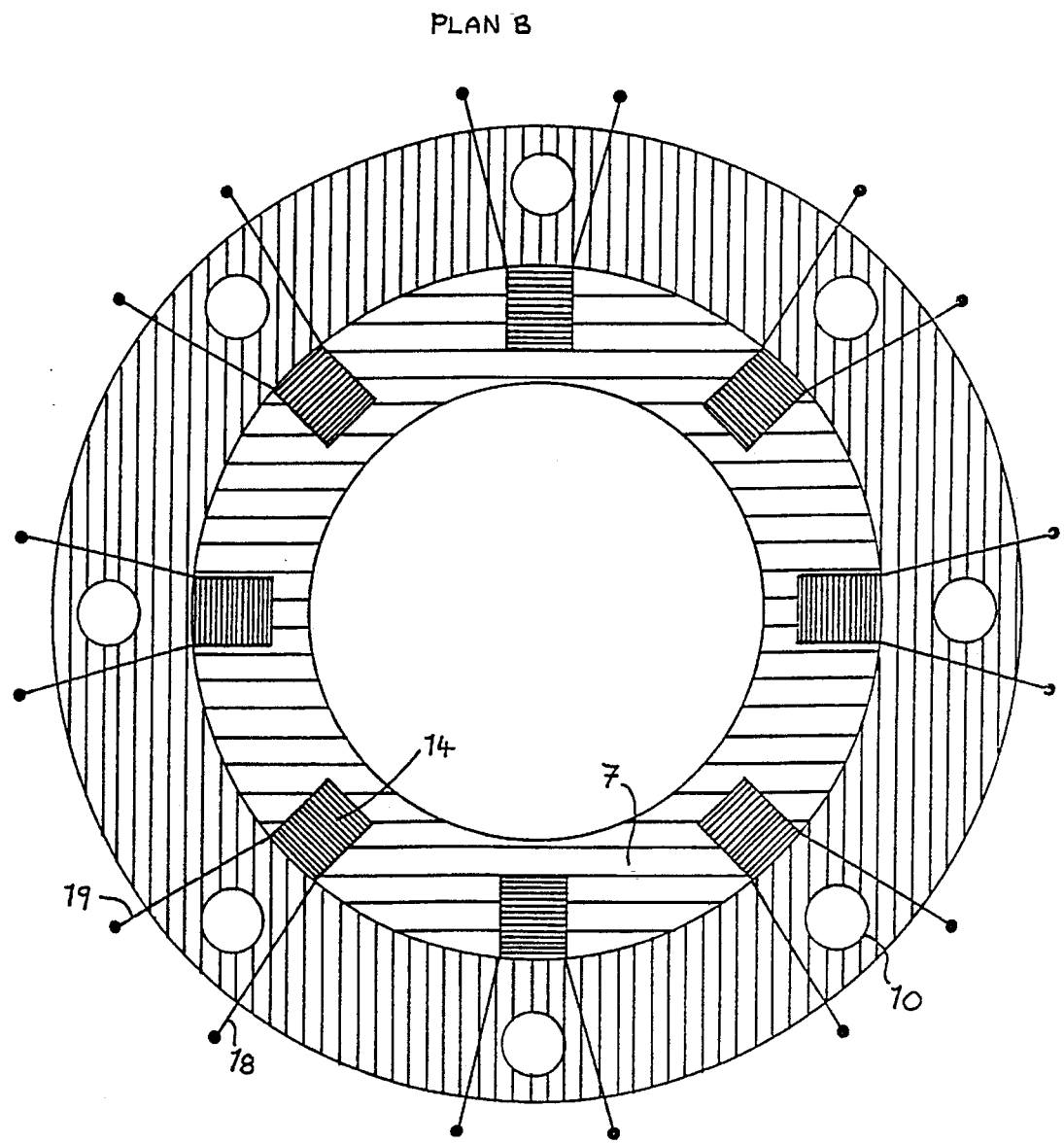
FIG. 3 is a cross-sectional view (Plan B) of a gasket of the joint of FIG. 1, showing the location of the piezoelectric elements.

Referring to FIGS. 1 to 3 of the drawings, there is shown a first tubular component 1 having an inner face 2 and an outer face 3, and a second tubular component 4 having an inner face 5 and an outer face 6. Inner faces 2 and 5 have a gasket ring 7 interposed therebetween to act as a fluid seal.

A series of eight throughbores 8 are provided in tubular component 1 and a corresponding series of eight throughbores 9 are provided in tubular component 4. Passing through each pair of throughbores 8 and 9 is a respective threaded bolt 10 (two only being shown in FIG. 1, but as shown in FIG. 3, there are generally at least four bolts). At one end of each bolt 10 is an internally threaded nut 11; at the other is an internally threaded nut 12. The two components 1, 4 can be urged closer together, with the gasket ring 7 interposed, by appropriate tightening of the nuts 11, 12.

Referring to FIG. 2, the gasket ring 7 comprises gasket material 13 having at about the mid-plane of its thickness, a number of piezoelectric elements 14 each comprising a pair of electrodes 15 and 16 having sandwiched therebetween a piezoelectric material 17.

In the embodiment shown in FIG. 3 there is a total of eight piezoelectric elements (one for each bolt) 14 equispaced around the circumference of the gasket between the two tubular components.

The electrodes 15 and 16 are connected to respective lead wires 18, 19; when pressure is applied by means of the bolts, the pressure therefore acts directly on the top and bottom faces of the piezoelectric element 14 in the direction of arrows A, B shown in FIG. 2, the pressure being transferred to the pressure fluctuation is produced in the piezoelectric element, and an output signal is therefore generated in lead wires 18, 19.

As mentioned above, the piezoelectric elements 14 may be equispaced around the circumference; for example, the embodiment of FIG. 3 shows eight piezoelectric elements spaced around the gasket 7.

Figure 4:
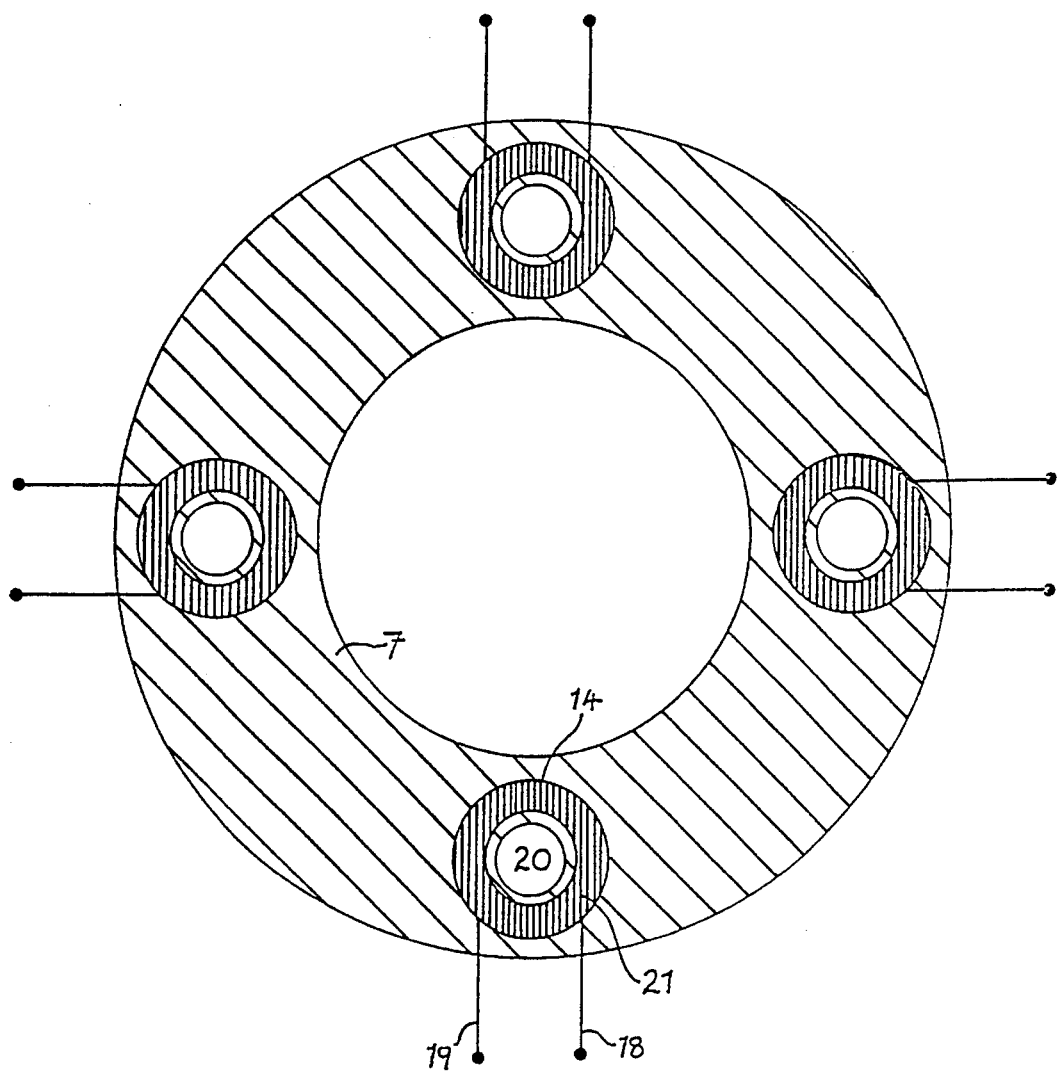
FIGS. 4, 5 and 6 are further cross-sectional views of some alternative gaskets to that of FIG. 3, showing the location of the various forms of piezoelectric elements.
Figure 5:
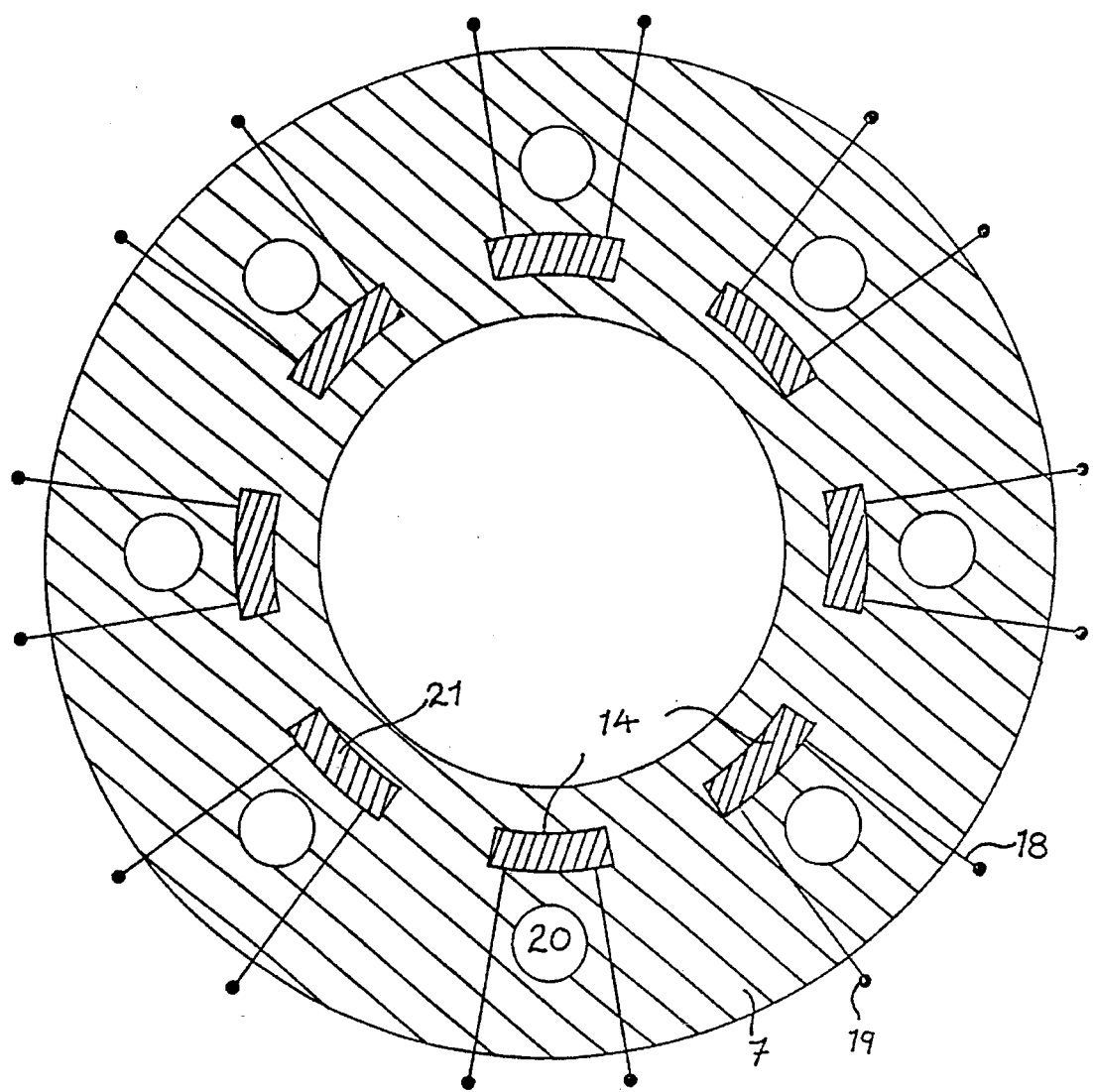
Figure 6:
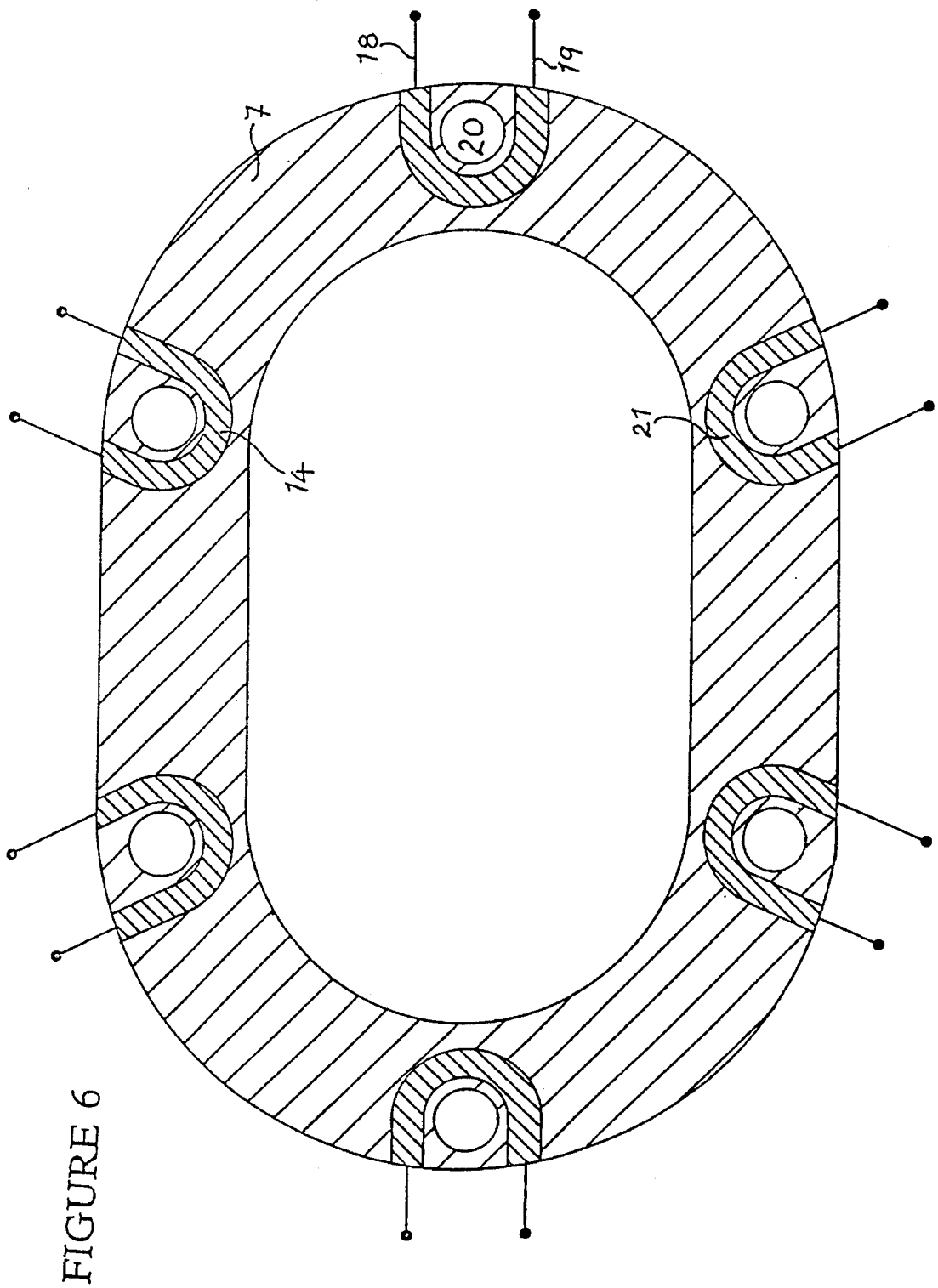

In some alternative embodiments, as shown in FIGS. 4, 5 and 6, the gasket may have apertures 20 therethrough, arranged to be complementary to the throughbores in the tubular components, such that bolts 10 can pass therethrough. Located within the gasket are various shapes of piezoelectric elements 21, each located in the proximity of the respective aperture 20.

Figure 7:
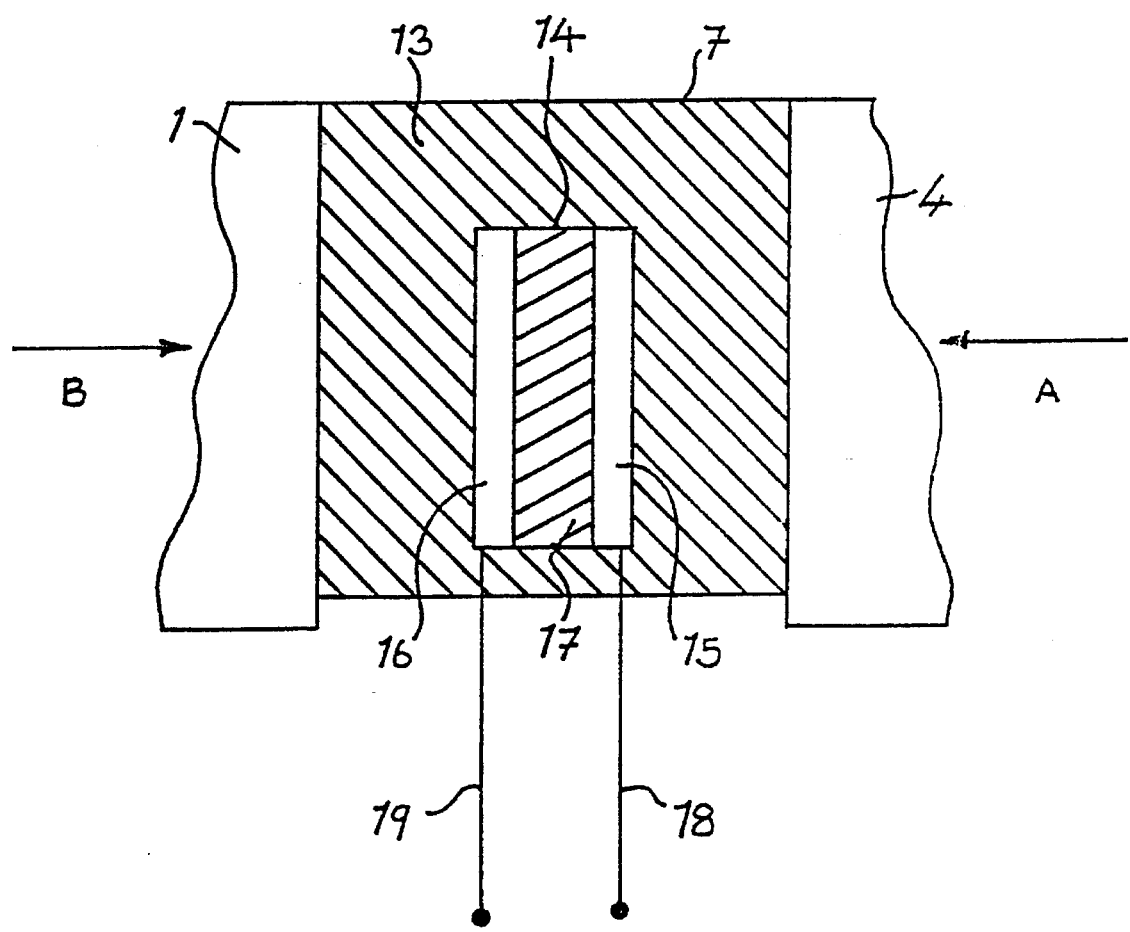
FIG. 7 is a longitudinal sectional view of an alternative means of positioning a piezoelectric element within a gasket in a joint according to the invention.

FIG. 7 shows an alternative to FIG. 2, in which like parts are denoted by like reference numerals. In the embodiment of FIG. 7, the piezoelectric element is within the body of the gasket and does not protrude from an edge.

I claim:

1. A joint comprising a first joint component having an axial aperture, a second joint component having an axial aperture arranged to be coaxial with the first mentioned aperture, a gasket arranged to be interposed between said components and a plurality of bolts arranged to secure said first joint component to said second component, with said gasket interposed therebetween with opposed faces in contact with respective joint components, wherein said gasket incorporates a plurality of stress or strain responsive elements substantially equispaced around the entire periphery of said gasket, each of said responsive elements being closer to a respective proximate bolt than to any other bolt such that respective responsive elements are arranged to produce respective outputs relating to the torque applied to a respective proximate bolt, the spacing of each said responsive element relative to its respective proximate bolt being substantially equal, each of said responsive elements comprising a pair of electrodes having a stress or strain responsive material sandwiched therebetween, each said responsive element having opposed faces which are spaced from and interposed between the respective opposed faces of said gasket, and means for connecting each of said responsive elements to an output display so as to give detectable indication of the stress or strain applied to each individual one of said elements corresponding to the torque force applied to each said proximate bolt.

2. A joint according to claim 1, wherein the joint components comprise tubular members and the gasket is annular.

3. A joint according to claim 1, wherein said responsive elements are encapsulated within said gasket.

4. A joint as in one of claims 1 to 3, which comprises at least four of said responsive elements.

5. A joint according to claim 1, in which said gasket has throughbores therethrough arranged to be complementary to throughbores provided for said bolts in said first and second joint components.

6. A joint according to claim 1, wherein said plurality of responsive elements are equal in number to the number of said plurality of bolts.

7. A joint according to claim 1, wherein said plurality of responsive elements are arranged around the entire periphery of said gasket such that a line drawn from the axis of said aperture radially outward through each bolt passes through a respective responsive element.

8. A joint according to claim 1, wherein said responsive elements comprise piezoelectric elements.

9. A joint according to claim 1, wherein said responsive elements comprise strain gauges.

* * * * *